United States Patent
Taipale et al.

(10) Patent No.: US 6,959,035 B2
(45) Date of Patent: Oct. 25, 2005

(54) POST-CORRELATION INTERPOLATION FOR DELAY LOCKED LOOPS

(75) Inventors: Dana J. Taipale, Austin, TX (US); Dipesh Koirala, Austin, TX (US)

(73) Assignee: FreeScale, Inc., Austin, TX (US)

( * ) Notice: Subject to any disclaimer, the term of this patent is extended or adjusted under 35 U.S.C. 154(b) by 765 days.

(21) Appl. No.: 10/033,513

(22) Filed: Dec. 26, 2001

(65) Prior Publication Data

US 2003/0118085 A1   Jun. 26, 2003

(51) Int. Cl.[7] .................. H04B 1/69; H04B 1/707; H04B 1/713
(52) U.S. Cl. ............... 375/150; 136/142; 136/147; 136/343; 136/373; 136/376
(58) Field of Search ............................ 375/150, 136, 375/142, 147, 343, 373, 376

(56) References Cited

U.S. PATENT DOCUMENTS 6,201,828 B1 * 3/2001 El-Tarhuni et al. ......... 375/150
2002/0037028 A1 * 3/2002 Baltersee et al. .......... 375/148
2002/0080862 A1 * 6/2002 Ali ............................ 375/148

* cited by examiner

*Primary Examiner*—Mohammed Ghayour
*Assistant Examiner*—Juan Alberto Torres
(74) *Attorney, Agent, or Firm*—Charles W. Bethards

(57) ABSTRACT

A Code Division Multiple Access (CDMA) post-correlation processing system (12) for delay locked loop processing reduces the control data rate into a delay locked loop (DLL) processor and the number of required interpolation operations by executing a portion of the interpolation operations at a symbol data rate rather than at a chiprate. Specifically, an interpolator (16) generates time shifted chip samples based on input CDMA chip samples. First and second correlators (22, 24) extract ontime control and data symbol samples, respectively, from ontime input CDMA chip samples. A third correlator (26) extracts first non-ontime control symbol samples from non-ontime CDMA chip samples. The first non-ontime control symbol samples are then input with the ontime control symbol samples to a post-correlation interpolator (28) operating at a symbol rate to generate second non-ontime symbol samples necessary for Delay Locked Loop (DLL) processing.

19 Claims, 3 Drawing Sheets

POST-CORRELATION INTERPOLATION FOR DELAY LOCKED LOOPS

BACKGROUND OF THE INVENTION

1. Field of the Invention

The present invention relates generally to signal processing, and specifically to signal processing in which symbol samples for delay locked loop processing are extracted pre and post correlator processing.

2. Description of Related Art

In a wideband Code Division Multiple Access (CDMA) system, multiple paths of a transmitted signal can be tracked using a rake receiver implemented at a base station due to the nature of spread spectrum sequences in a wireless channel. The rake receiver functions as several receivers operating with associated propagation delays based on the respective delays experienced by arriving multipath signals. The rake receiver has a tracking loop for each rake finger of a user that tracks the movement of the fingers typically through the use of a delay locked loop (DLL). The DLL, which computes the error in, and subsequently shifts, the sample time, needs to be performed on a per finger, or multipath, basis.

To compute the error in the sample time, the DLL requires early and late sample times. Specifically, the DLL takes the early and late samples for a given multipath signal being tracked and calculates the energy for the early and late correlations. The difference between these two energies is multiplied by a pre-computed gain factor to obtain a timing correction. A third ontime sample sequence is used for demodulation purposes as it has the largest signal to noise ratio.

In conventional DLLs, interpolators provide the early, late and ontime samples so that three samples are provided for each CDMA symbol. A conventional hardware implementation often processes the early and late correlation outputs in parallel. As the data resulting from the early and late correlations is processed using dedicated links, transfer bandwidth is not a problem.

In new high end devices, more processing is being moved to digital signal processors. In addition, the potential for performance improvements via more sophisticated software algorithms creates motivation to place more functions like DLL processing in software. However, this shift in processing puts a strain on Digital Signal Processor (DSP) bandwidth, as such bandwidth is typically small enough to create processing bottlenecks at the DSP I/O interface and therefore slow down DSP processing times.

Clearly a need exists for more efficient signal processing systems for, for example, delay locked loops.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
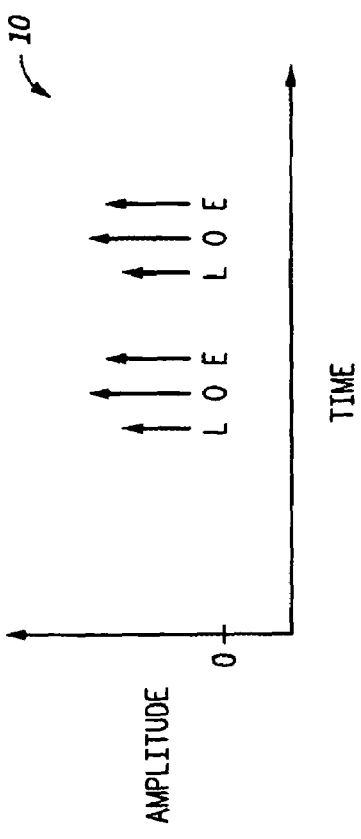
FIG. 1 is a diagram of an exemplary stream of interpolated CDMA symbol samples of the type produced by a preferred embodiment of a post-correlation processing system according to the present invention.

Referring now to the drawings in which like numerals reference like parts, FIG. 1 shows generally at 10 an exemplary stream of data symbol samples, such as an interpolated sequence of CDMA data symbol samples, which, as is well known in the art, are digital representations of transmitted analog signal components. These symbol samples include early (E), ontime (O), and late (L) symbol samples. The early and late symbol samples E, L are generated from out of phase chip samples and therefore have smaller signal to noise ratios than the ontime symbol samples O due, for example, to interference from other signals. All of the samples E, O, L are of the type produced by a preferred embodiment of an inventive signal processing system, specifically a post-correlation processing system 12 (FIG. 2) which will now be discussed in detail.

Figure 2:
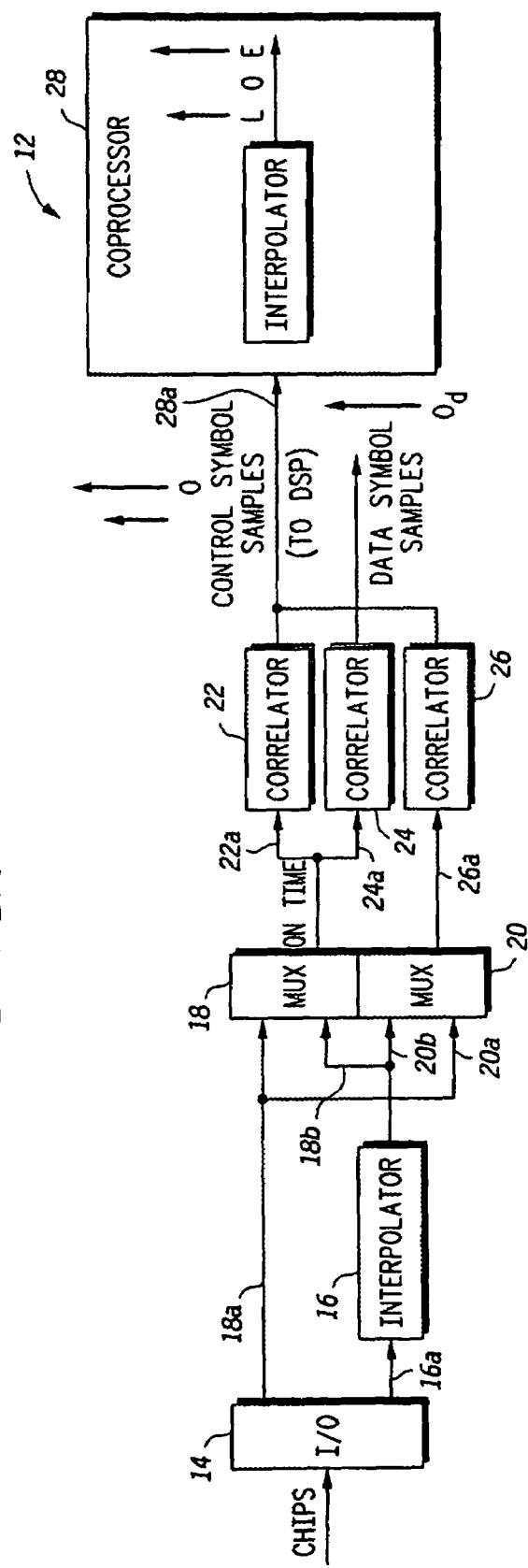
FIG. 2 is a block diagram of a preferred embodiment of a post-correlation processing system according to the present invention.

Referring to FIG. 2, the post-correlation processing system 12 performs an essential function for delay locked loops and processing therein and includes an Input/Output (I/O) interface 14 for receiving input signal samples, preferably, CDMA chip samples such as those generated at a known analog processing circuit (FIG. 3) that samples received signals, preferably, CDMA received signals at, for example, two times the chip rate. The I/O interface 14 then distributes identical sets of these samples or input samples or chip samples to an interpolator 16, a first multiplexer 18, and a second multiplexer 20. Specifically, the I/O interface 14 distributes the chip samples directly to the interpolator through an interpolator input 16a and also directly to the first and second multiplexers 18, 20 through first and second multiplexer inputs 18a, 20a, respectively. The interpolator 16 is known and introduces a time offset to the input chip samples and interpolates between the input chip samples to increase chip resolution from, for example, ½ chip resolution if the chip samples are sampled at two times the chip rate to, for example, ⅛ chip resolution. The interpolator 16 thereby recovers time shifted samples or chip samples that are shifted in time relative to the chip samples from the I/O interface 14. Note that if or when the time reference (not shown) used to generate the samples or chip samples from I/O interface 14 is in phase or synchronized or nearly so with a desired CDMA spreading sequence these chip samples from I/O interface 14 will be ""ontime"" samples or ""ontime"" chip samples and the time shifted samples or time shifted chip samples recovered by interpolator 16 will then be non-ontime samples or non-ontime chip samples according to the conventions used within this disclosure. It follows that non-ontime is a general reference to either late or early samples or chip samples that are not in phase with any CDMA spreading sequences for any users/subscribers. In any event the recovered time shifted (whether non-ontime or ontime) chip samples are then distributed to both the first and second multiplexers 18, 20 through multiplexer inputs 18b, 20b.

It should be noted that the chip samples input directly from the I/O interface 14 into the first and second multiplexers 18, 20 on the multiplexer inputs 18a, 20a and the time shifted chip samples generated by the interpolator 16 and input into the first and second multiplexers 18, 20 through the multiplexer inputs 18b, 20b enable the first multiplexer 18 to always output an ontime correlator signal, specifically ontime chip samples and the second multiplexer"

20 to always output a non-ontime correlator signal, specifically non-ontime chip samples. In summary this is accomplished by using an error signal (not shown) provided according to known DLL processing procedures that is indicative of whether actual sampling times are equal to desired sampling times, specifically whether the sampling clock is properly synchronized with the desired received signal or here the desired received CDMA spreading sequence. This error signal is used to adjust, retard or advance, the sampling clock and also used to control or to generate signals that control the multiplexers 18, 20 to select or provide, respectively, the ontime and non-ontime samples.

By way of example, suppose the chip samples input into the first multiplexer 18 and the interpolator 16 from the I/O interface 14 are ontime chip samples, the interpolator 16 would generate non-ontime chip samples as discussed above. However, if the chip samples input into the first multiplexer 18 through the multiplexer input 18a and into the interpolator 16 through the interpolator input 16a are non-ontime chip samples, such as early or late chip samples E, L, the interpolator 16 would perform the necessary interpolation operation to time shift the non-ontime chip samples to generate ontime chip samples for output to the first multiplexer 18 through the multiplexer input 18b. Similarly, the second multiplexer 20 will always output non-ontime chip samples, as it is controlled to select the non-ontime chip samples from the chip samples input directly from the I/O interface 14 on the multiplexer input 20a and the interpolated and time shifted chip samples input from the interpolator 16 on the multiplexer input 20b.

These input samples and time shifted samples are selectively coupled by the multiplexers 18, 20 to correlators 22, 24, 26. Specifically identical sets of ontime chip samples output from the first multiplexer 18 are input into first and second correlators 22, 24 through first and second correlator inputs 22a, 24a, respectively, while the non-ontime chip samples output from the second multiplexer 20 are input into a third correlator 26 through a third correlator input 26a. Generally, the first, second and third correlators 22, 24, 26 strip away, or de-spread, the CDMA fast sequences from the respective input chip samples and then sample the de-spread chip samples at a symbol rate to produce symbol samples, or digital representations of components of a particular analog wireless communications signal, as is well known in the art. Generally as is known the first and third correlators 22, 26 correlate using a control spreading sequence and the second correlator correlates using a data spreading sequence a is known. By acting as a lowpass filter and by producing enough symbol samples within a specified time period, the correlators 22, 24, 26 are each capable of isolating, in the digital domain, the waveform representing the particular wireless communications signal and then outputting the appropriate symbol samples for use in post-correlation processing in accordance with the present invention.

More specifically, the first and second correlators 22, 24 extract or generate ontime control (used for timing control, format information, and the like as known) and data symbol samples O, $O_d$ respectively from the ontime chip samples input through the correlator inputs 22a, 24a. The ontime control symbol samples O generated by the first correlator 22 are input to a post-correlation interpolator 28, part of a post correlator or post correlation processor, preferably DSP based, through a post-correlation interpolator input 28a, while the ontime data symbol samples $O_d$ generated by the second correlator 24 are available for further processing for purposes of communicating voice or data to the user. The first non-ontime symbol samples, specifically non-ontime control symbol samples, which, as already discussed, may be either early or late symbol samples E, L, generated by the third correlator 26, are also input along with the ontime control symbol samples O as a postcorrelator data stream into the post-correlation interpolator 28 through the post-correlation interpolator input 28a. Combining the symbol stream from correlator 22 and the symbol stream from correlator 26 provides a symbol stream at two times the symbol rate or the Nyquist rate for the control symbol samples as required for use by the post-correlation interpolator 28.

It should be noted that the correlators 22, 24, 26 process or operate on samples or chip samples at the chip rate rather than two times the chip rate. Thus the two times chip rate or Nyquist rate chip samples input to the interface I/O that are required at the input 16a for the interpolator 16 to function properly will have to be reduced in sample rate to chip samples at the chip rate at some point in the processing chain. This can be done by discarding every other sample or potentially by some known combinatorial process to provide one sample from every two at either; the input sections of each of the correlators 22, 24, 26, or within the multiplexers 18, 20, or at the output of the interface I/O 18a, 20a and the output of the interpolator 16. This selection is largely a matter of choice, however since it is usually more efficient to operate at slower speeds some may have a preference to do this as early in the processing chain as possible.

The post-correlation interpolator 28, which as is known may be either a hardware or a software implemented interpolator (software running on a DSP for example), processes the input ontime control and non-ontime control symbol samples along with other ontime control and non-ontime control symbol samples from the earlier and later time periods surrounding the ontime control and first non-ontime control symbol samples to produce second non-ontime symbol samples that are either the early or late symbol samples depending on the non-ontime symbol samples input into the post-correlation interpolator 28. Specifically, if the post-correlation processing system 12 is configured so that early symbol samples E are input into the postcorrelator processor, specifically post correlation interpolator 28, the postcorrelator interpolator 28 will generate late symbol samples L. If, however, the post-correlation processing system 12 is configured so that late symbol samples L are input into the postcorrelator processor, the post-correlation interpolator 28 will generate early symbol samples E.

The post correlation interpolator 28 is capable of generating these second non-ontime symbol samples because it includes a memory (not shown) for storing symbol samples from previous symbol sampling periods. The post correlation interpolator 28 combines symbol samples from these stored symbol samples with the ontime control and first non-ontime symbol samples input on the postcorrelator processor input 28a, weights the input symbol samples and the stored symbol samples based on their timing (early, late, ontime, sampling offset) and the lowpass filter shape arising from the processing chain, and generates the resulting second non-ontime symbol samples at the symbol sampling rate that is much slower, and requires less processing power, than the chip sampling rate necessary at the interpolator 16. The resulting second non-ontime symbol samples are then output along with the first non-ontime symbol samples originally input into the postcorrelator processor for delay locked loop processing, while the ontime control symbol samples are output for control channel processing.

It should be appreciated that the post-correlation processing system according to the above discussed preferred embodiment of the present invention reduces processing requirements, and therefore hardware complexity and cost, associated with processing wide band spread spectrum signals such as CDMA chip samples prior to DLL processing. More particularly, the post-correlation processing system 12 reduces the number of precorrelator processing interpolators from two to one, as extraction of either early or late symbol samples is performed at a post-correlation symbol sampling rate that is less intensive from a processing standpoint than interpolation processing at a pre-correlation chip sampling rate. However, the post-correlation processing system 12 may reduce the number of precorrelator processing interpolators from three to one, as the interpolator 16 is usually hardware implemented and may require interpolation for early, late and ontime chip samples if the input chip samples are not the samples that are needed for interpolation. If the post-correlation interpolator 28 is software implemented, it may change its filter coefficients to facilitate receipt of the necessary symbol samples.

In addition, because the extraction of either early or late symbol samples is executed in a post-correlation manner, the number of input lines into the DSP, and therefore the DSP control data rate, is reduced. This reduction in the DSP control data rate frees up additional DSP I/O bandwidth and therefore greatly reduces the chance of a processing bottleneck occurring at the DSP I/O interface. Further, the post-correlation processing system 12 reduces the number of operations required to perform correlation functions by almost ½ because it replaces a chip rate interpolator with a symbol rate interpolator, and it eliminates a correlator that would otherwise be required for the above-discussed second non-ontime samples.

Figure 3:
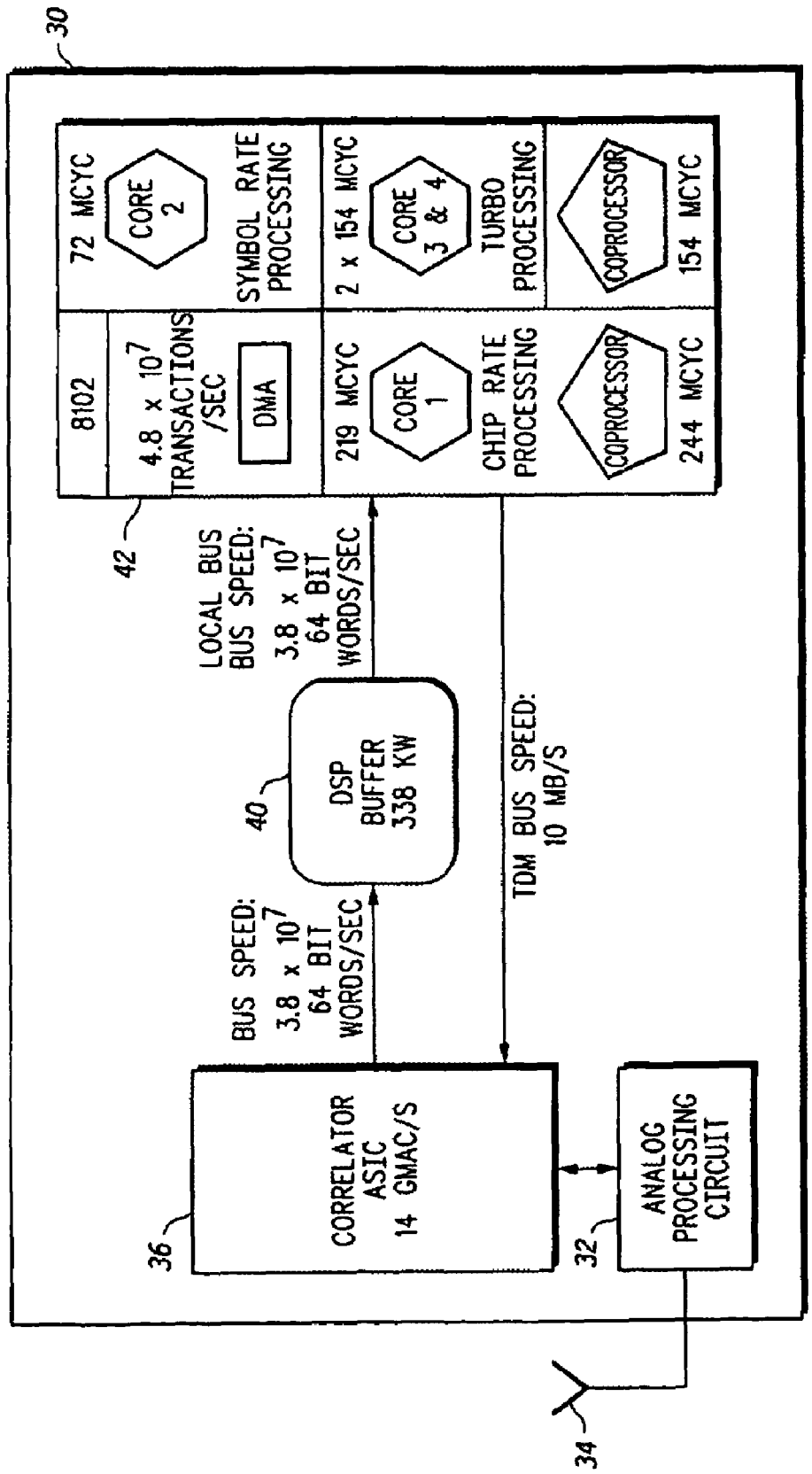
FIG. 3 is a block diagram of a rake receiver using the post-correlation processing system shown in FIG. 2.

FIG. 3 shows, in block diagram form, a preferred embodiment of an exemplary implementation of the post-correlation processing system in a rake receiver 30, such as may be utilized in a CDMA receiver for a cellular base station. However, it should be appreciated that this specific implementation is exemplary only, as the post-correlation processing system of the present invention may be implemented in any type of environment in which correlation functions must be processed, such as, for example, fast hopped spread spectrum communications systems as well as mobile handsets or radios within a CDMA system. Specifically, an analog processing circuit 32 removes the carrier frequency from a signal, such as a CDMA signal received by an antenna 34 and samples the received CDMA signal at a predetermined sampling rate, such as twice the chip rate, to produce corresponding CDMA chip samples. The CDMA chip samples are input into a correlator Application-Specific Integrated Circuit (ASIC) 36 in which, according to this specific configuration, all of the components of the post-correlation processing system 12 of the present invention are implemented, including the DSP for implementing, either via hardware or software, the postcorrelation processor 28. Alternatively, if the post-correlation processing system 12 of the present invention is utilized within, for example, a mobile handset environment, the components implemented within the ASIC 36 could alternatively be software implemented. The correlator ASIC 36 outputs generated ontime and non-ontime symbol samples to a DSP buffer 40 in which the early, late and on time symbol samples E, L, O are stored before being input into a processor 42, such as a Motorola 8102 base station processor, for additional processing including DLL, symbol rate, and chip rate processing as is known in the art.

Figure 4:
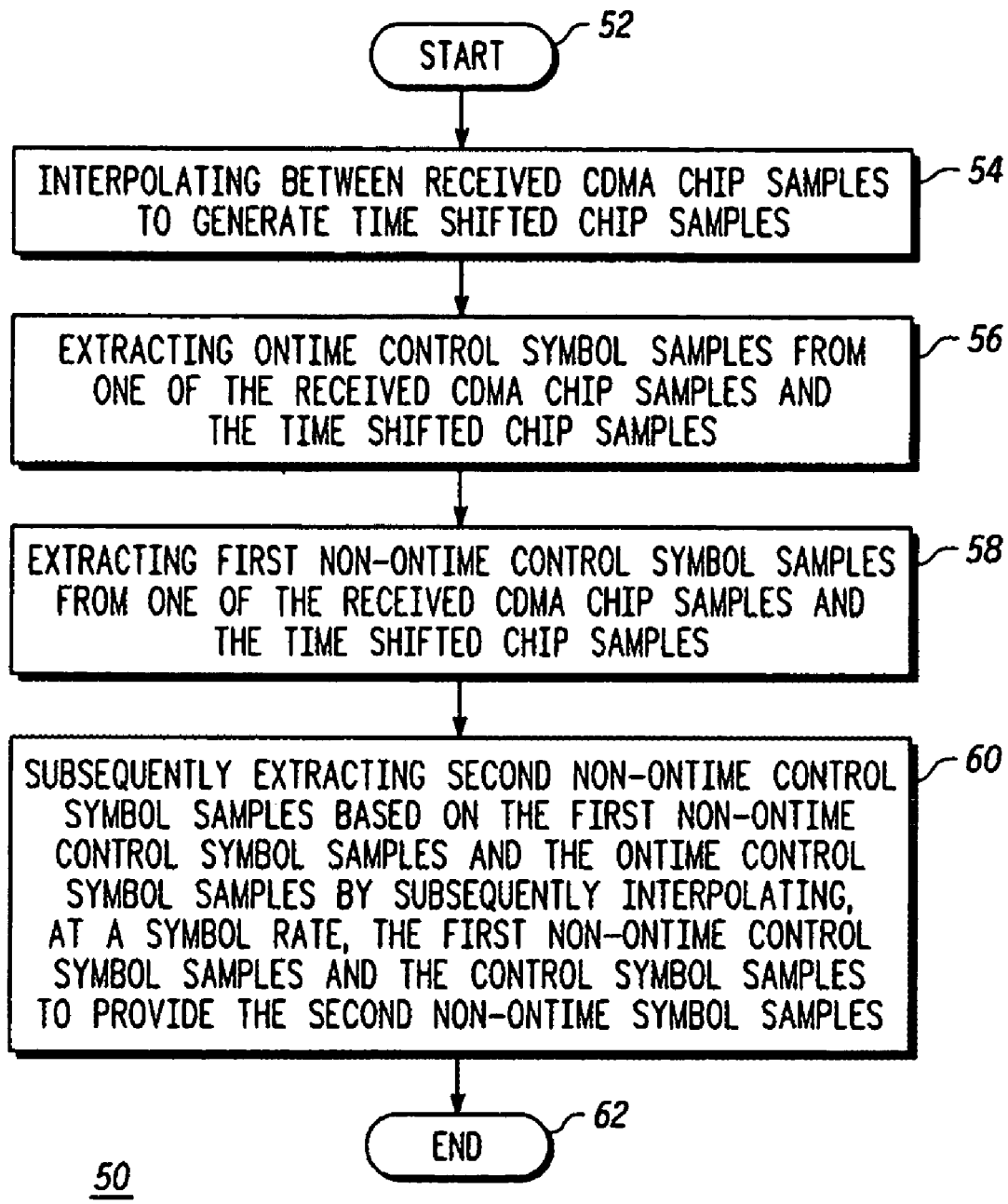
FIG. 4 is a flow chart illustrating a method of processing samples for delay locked loop processing.

FIG. 4 depicts a flow chart illustrating a method 50 of processing samples for delay locked loop processing. The method 50 starts at 52 and then shows interpolating 54 between received samples to generate time shifted samples, e.g., received CDMA chip samples to generate time shifted CDMA chip samples. The method further includes extracting 56 ontime control symbol samples from one of the received samples (e.g., CDMA chip samples) and the time shifted samples (e.g., time shifted CDMA chip samples) and extracting 58 first non-ontime control symbol samples from one of the received samples and the time shifted samples. Furthermore, the method includes subsequently extracting 60 second non-ontime symbol samples based on the first non-ontime control symbol samples and the ontime control symbol samples. In one embodiment the subsequently extracting 60 an include subsequently interpolating, at a symbol rate, the first non-ontime control symbol samples and the control symbol samples to provide the second non-ontime symbol samples. As suggested above, the received samples can be CDMA chip samples and the time shifted samples can be time shifted chip samples.

While the above description is of the preferred embodiment of the present invention, it should be appreciated that the invention may be modified, altered, or varied without deviating from the scope and fair meaning of the following claims.

What is claimed is:
1. A signal processing system for delay locked loop processing, comprising:
   an interpolator for generating time shifted samples based on input samples;
   first and second correlators, coupled to the time shifted samples and the input samples, for extracting, respectively, ontime control symbol samples and data symbol samples;
   a third correlator, coupled to the time shifted samples and the input samples, for extracting first non-ontime control symbol samples; and
   wherein the first non-ontime control symbol samples and the ontime control symbol samples are used for extracting second non-ontime symbol samples.

2. The signal processing system of claim 1, further comprising a postcorrelator interpolator for extracting the second non-ontime symbol samples using the first non-ontime control symbol samples and the ontime control symbol samples.

3. The signal processing system of claim 2, wherein the postcorrelator interpolator is implemented in an Application-Specification Integrated Circuit (ASIC).

4. The signal processing system of claim 2, wherein the postcorrelator interpolator comprises a software implemented interpolator.

5. The signal processing system of claim 1, wherein the interpolator generates time shifted chip samples based on input CDMA chip samples and the system further comprises:
   a first multiplexer for outputting an ontime correlator signal from the input CDMA chip samples and the time shifted chip samples generated by the interpolator for input into both the first and second correlators;
   a second multiplexer for outputting a non-ontime correlator signal from the input CDMA chip samples and the time shifted chip samples generated by the interpolator for input into the third correlator; and
   wherein the first multiplexer enables ontime input CDMA chip samples to be input into the first and second correlators, and the second multiplexer enables non-ontime chip samples to be input into the third correlator.

6. The signal processing system of claim 1, wherein the first non-ontime control symbol samples comprise early symbol samples, and the second non-ontime symbol samples comprise late symbol samples.

7. The signal processing system of claim 1, wherein the first non-ontime control symbol samples comprise late symbol samples, and the second non-ontime symbol samples comprise early symbol samples.

8. A CDMA receiver, comprising:
an analog processing circuit for removing a carrier frequency from a received CDMA signal and for sampling the received CDMA signal at a predetermined sampling rate to produce corresponding CDMA chip samples;
an interpolator for receiving the CDMA chip samples from the analog processing circuit and for generating time shifted chip samples from the CDMA chip samples;
first and second correlators for extracting, respectively, ontime control symbol samples and data symbol samples from one of the CDMA chip samples and the time shifted chip samples;
a third correlator for extracting first non-ontime control symbol samples from one of the CDMA chip samples and the time shifted chip samples; and
wherein the first non-ontime control symbol samples and the ontime control symbol samples are used for extracting second non-ontime symbol samples for delay locked loop processing.

9. The CDMA receiver of claim 8, further comprising a postcorrelator interpolator for extracting the second non-ontime symbol samples using the first non-ontime control symbol samples and the ontime control symbol samples.

10. The CDMA receiver of claim 9, wherein:
the first and second correlators are for extracting, respectively, the ontime control symbol samples and data symbol samples at a chip sampling rate;
the third correlator is for extracting the first non-ontime control symbol samples at the chip sampling rate; and
the postcorrelator interpolator is for extracting the second non-ontime symbol samples at a symbol sampling rate.

11. The CDMA receiver of claim 9, wherein the postcorrelator interpolator is implemented in an ASIC.

12. The CDMA receiver of claim 9, wherein the postcorrelator interpolator comprises software implemented interpolator.

13. The CDMA receiver of claim 8, further comprising:
a first multiplexer for outputting an ontime correlator signal from the CDMA chip samples and the time shifted chip samples for input into both the first and second correlators; and
a second multiplexer for outputting a non-ontime correlator signal from the CDMA chip samples and the time shifted chip samples for input into the third correlator.

14. The CDMA receiver of claim 8, wherein the first non-ontime control symbol samples comprise early symbol samples; and the second non-ontime symbol samples comprise late symbol samples.

15. The CDMA receiver of claim 8, wherein the first non-ontime control symbol samples comprises late symbol samples, and the second non-ontime symbol samples comprise early symbol samples.

16. The CDMA receiver of claim 8, wherein the analog processing circuit is for sampling the received CDMA signal at a sampling rate that is at least twice a chip rate to produce corresponding CDMA chip samples.

17. A method of processing samples for delay locked loop processing, comprising:
interpolating between received samples to generate time shifted samples;
extracting ontime control symbol samples from one of the received samples and the time shifted samples;
extracting first non-ontime control symbol samples from one of the received samples and the time shifted samples; and
subsequently extracting second non-ontime symbol samples based on the first non-ontime control symbol samples and the ontime control symbol samples.

18. The method of claim 17, wherein the subsequently extracting second non-ontime symbol samples based on the first non-ontime control symbol samples and the ontime control symbol samples comprises subsequently interpolating, at a symbol rate, the first non-ontime control symbol samples and the control symbol samples to provide the second non-ontime symbol samples.

19. The method of claim 17 wherein the received samples are CDMA chip samples and the time shifted samples are time shifted chip samples.

* * * * *